US00RE49609E

(19) United States
(12) Reissued Patent
Kasaba et al.

(10) Patent Number: US RE49,609 E
(45) Date of Reissued Patent: *Aug. 15, 2023

(54) VEHICLE LAMP CONTROLLER, VEHICLE LAMP SYSTEM, AND VEHICLE LAMP CONTROL METHOD

(71) Applicant: KOITO MANUFACTURING CO., LTD., Tokyo (JP)

(72) Inventors: Yusuke Kasaba, Shizuoka (JP); Masashi Yamazaki, Shizuoka (JP); Atsushi Toda, Shizuoka (JP)

(73) Assignee: KOITO MANUFACTURING CO., LTD., Tokyo (JP)

( * ) Notice: This patent is subject to a terminal disclaimer.

(21) Appl. No.: 16/277,009

(22) Filed: Feb. 15, 2019

Related U.S. Patent Documents

Reissue of:
(64) Patent No.: 8,838,343
Issued: Sep. 16, 2014
Appl. No.: 13/281,075
Filed: Oct. 25, 2011

U.S. Applications:
(62) Division of application No. 15/265,286, filed on Sep. 14, 2016, which is an application for the reissue of Pat. No. 8,838,343.

(30) Foreign Application Priority Data

Oct. 26, 2010 (JP) ..... 2010-239736
Jul. 12, 2011 (JP) ..... 2011-153592

(51) Int. Cl.
*G05D 1/00* (2006.01)
*B60W 40/076* (2012.01)
(Continued)

(52) U.S. Cl.
CPC ..... *B60Q 1/10* (2013.01); *B60W 40/076* (2013.01); *B60W 40/11* (2013.01);
(Continued)

(58) Field of Classification Search
CPC ..... B60Q 2300/112; B60Q 2300/114; B60Q 2300/116; B60Q 2300/324;
(Continued)

(56) References Cited

U.S. PATENT DOCUMENTS 2,733,335 A 1/1956 Falge
5,896,011 A 4/1999 Zillgitt
(Continued)

FOREIGN PATENT DOCUMENTS

DE 102005018484 A1 * 10/2006 ..... B60T 8/1706
DE 102009046389 A1 * 5/2011 ..... G01C 9/00
(Continued)

OTHER PUBLICATIONS

Definition of device, https://www.merriam-webster.com/dictionary/device, downloaded Sep. 24, 2020 (Year: 2020).*
(Continued)

*Primary Examiner* — Karin Reichle
(74) *Attorney, Agent, or Firm* — Sughrue Mion, PLLC

(57) ABSTRACT

A vehicle lamp controller, a vehicle lamp system, and a vehicle lamp control method are provided. The vehicle lamp system includes an acceleration sensor, a vehicle lamp, and the vehicle controller. The controller includes a receiver configured to receive an acceleration information detected by the acceleration sensor, a control unit configured to derive a vehicle longitudinal direction acceleration and a vehicle vertical direction acceleration from the acceleration information, and to generate a control signal for instructing an adjustment of an optical axis of the vehicle lamp, based on a variation in a ratio between a temporal change amount of the vehicle longitudinal direction acceleration and a temporal change amount of the vehicle vertical direction acceleration during at least one of an acceleration and a deceleration of a vehicle, and a transmitter configured to transmit
(Continued)

the control signal to an optical axis adjusting portion of the vehicle lamp.

2 Claims, 7 Drawing Sheets

(51) Int. Cl.
*B60Q 1/10* (2006.01)
*B60W 40/11* (2012.01)

(52) U.S. Cl.
CPC .. *B60Q 2300/112* (2013.01); *B60Q 2300/114* (2013.01); *B60Q 2300/116* (2013.01); *B60Q 2300/132* (2013.01); *B60Q 2300/324* (2013.01); *B60W 2520/105* (2013.01)

(58) Field of Classification Search
CPC .... B60Q 2300/132; B60Q 1/115; B60Q 1/12; B60Q 1/14; B60W 2520/105; B60W 2520/16; F21S 8/10; F21V 13/00; F21V 14/02
USPC ..... 701/36, 49, 116
See application file for complete search history.

(56) References Cited

U.S. PATENT DOCUMENTS 5,907,196 A 5/1999 Hayami et al.
6,109,759 A 8/2000 Tanabe et al.
6,183,118 B1 2/2001 Toda
6,193,398 B1 2/2001 Okuchi et al.
6,229,263 B1 * 5/2001 Izawa ..... 315/80
6,278,912 B1 8/2001 Amano
6,374,171 B2 4/2002 Weiberle et al.
6,430,521 B1 8/2002 Toda
6,450,673 B1 9/2002 Toda
6,817,741 B2 11/2004 Toda
7,213,117 B2 5/2007 Wakabayashi et al.
7,495,549 B2 2/2009 Acres
7,552,001 B2 6/2009 Ando
8,412,485 B2 * 4/2013 Brown ..... B60G 17/017 73/1.13
8,814,402 B2 8/2014 Kasaba
8,858,046 B2 10/2014 Yamazaki
9,050,927 B2 6/2015 Kasaba
9,067,533 B2 6/2015 Kasaba
9,096,171 B2 8/2015 Kasaba
9,238,431 B2 1/2016 Kasaba
9,709,391 B2 * 7/2017 Bando ..... G01P 3/00
9,969,321 B2 5/2018 Watano
2002/0022924 A1 * 2/2002 Begin ..... G01C 21/26 701/408
2002/0120551 A1 8/2002 Jones, III
2004/0125608 A1 7/2004 Izawa
2005/0002195 A1 1/2005 Katayama et al.
2005/0027419 A1 * 2/2005 Horii ..... B60Q 1/12 701/49
2006/0087856 A1 * 4/2006 Sugimoto ..... B60Q 1/18 362/466
2006/0129291 A1 6/2006 Lu et al.
2006/0291222 A1 12/2006 Ando
2007/0250263 A1 * 10/2007 Yamada ..... B60Q 1/085 701/408
2008/0294342 A1 * 11/2008 Hoshizaki ..... G01S 19/47 701/472
2008/0319589 A1 * 12/2008 Lee ..... G01C 9/08 701/1
2009/0043458 A1 * 2/2009 Kamioka ..... B60Q 1/085 701/49
2009/0177390 A1 * 7/2009 Mikusiak ..... G01C 21/32 701/414
2009/0248256 A1 * 10/2009 Nishijima ..... B60Q 1/115 701/49
2010/0106358 A1 4/2010 Lu
2010/0286896 A1 * 11/2010 Yamada ..... G01C 21/30 701/117
2011/0066347 A1 * 3/2011 Yow ..... B60T 8/885 701/80
2011/0216548 A1 * 9/2011 Fritz ..... B60Q 1/12 362/465
2011/0276216 A1 * 11/2011 Vaughan ..... B60W 10/18 701/31.4
2011/0317439 A1 12/2011 Yamazaki et al.
2012/0101692 A1 4/2012 Kasaba et al.
2014/0156150 A1 6/2014 Kasaba
2015/0039191 A1 2/2015 Cauthen
2018/0077853 A1 3/2018 Dashiell et al.
2021/0039665 A1 * 2/2021 Kaminade ..... B60W 50/10

FOREIGN PATENT DOCUMENTS

EP 0 847 895 A2 6/1998
EP 1 147 929 A1 10/2001
GB 2357148 A * 6/2001 ..... G01C 9/08
JP 2-164628 A 6/1990
JP 11-105620 A 4/1999
JP 2000-85459 A 3/2000
JP 2010-85459 A 3/2000
JP 2000-211423 A 8/2000
JP 2001-341578 A 12/2001
JP 2004-314856 A 11/2004
JP 2005-67300 A 3/2005
JP 2005-81867 A 3/2005
JP 2006-047156 A 2/2006
JP 2009-126268 A 6/2009
JP 2010-143424 A 7/2010
JP 2010-143506 A 7/2010
JP 2012-106719 A 6/2012

OTHER PUBLICATIONS

Definition of device, American Heritage Dictionary, downloaded Sep. 24, 2020 (Year: 2020).*
English abstractor DE-102009046389 (Year: 2011).*
"Standstill." Merriam-Webster.com Dictionary, Merriam-Webster, https://www.merriam-webster.com/dictionary/standstill. Accessed Sep. 1, 2022. (Year: 2022).*
"Standing." Merriam-Webster.com Dictionary, Merriam-Webster, https://www.merriam-webster.com/dictionary/standing. Accessed Sep. 1, 2022. (Year: 2022).*
"Static." Merriam-Webster.com Dictionary, Merriam-Webster, https://www.merriam-webster.com/dictionary/static. Accessed Sep. 1, 2022. (Year: 2022).*
Communication dated Feb. 12, 2015 issued by the Japanese Patent Office in counterpart Japanese Patent Application No. 2011-153592.
Communication dated Feb. 25, 2016 issued by the Japanese Patent Office in counterpart Japanese Patent Application No. 2015-077432.
Communication dated Jan. 30, 2015 issued by the Japanese Patent Office in counterpart Japanese Patent Application No. 2011-139615.
Communication dated Jun. 21, 2016 issued by the Japanese Patent Office in counterpart Japanese Patent Application No. 2016-111521.
Communication dated May 13, 2016 issued by the Japanese Patent Office in counterpart Japanese Patent Application No. 2015-148612.
Office Action dated Dec. 13, 2016 by the Japanese Patent Office in counterpart Japanese Application No. 2015-148612.
Machine Translation of JP 2006-047156, AIPN, Translated JST Jul. 4, 2018.
Definition "hardware", American Heritage Dictionary, 6th ed., 2016, 2 pages.
Definition "processor", American Heritage Dictionary, 4th ed., 2000, 2 pages.
Definition "processor", Dictionary of Computing, 6th ed., 2010, 2 pages.
Definition "processor", Microsoft Computer Dictionary, 5th ed., 2002, 3 pages.
Definition "implement", The American Heritage Dictionary, 6th ed., 2016, 2 pages.

(56) References Cited

OTHER PUBLICATIONS

Definition "implement", Oxford English Dictionary, 2nd ed., 1989, 1 page.
Definition "implement", Merriam Webster Dictionary On-line, 2019, 5 pages.
Publication history, Oxford English Dictionary, 2019, 1 page.
Office Action dated May 9, 2019, issued by the United States Patent and Trademark Office in counterpart U.S. Appl. No. 15/265,286.
Communication dated Apr. 7, 2020, issued by the Japanese Patent Office in counterpart Japanese Application No. 2019-126062.
Communication dated May 27, 2020 issued by the United States Intellectual Property Office in counterpart U.S. Appl. No. 15/265,286.
"Controller | Definition of Controller at Dictionary.com", Dictionary.com, retrieved May 12, 2020, one page total, https://www.dictionary.com/browse/controller.
"Control unit", Computer Technology, Academic Press Dictionary of Science and Technology, 1992, two pages total, https://search.credoreference.com/content/entry/apdst/control_unit/.
"Dynamic | Definition of Dynamic by Merriam-Webster", Merriam-Webster, retrieved May 19, 2020, one page total, https://www.merriamwebster.com/dictionary/dynamic.
"Trigonometry lookup table", 2015, one page total, imgurl:https://improveyourmathfluency.files.wordpress.com/2015/08/trig-table.jpg.
Eric W. Weinsstein, "Trigonometry Angles", From Math World—A Wolfram Web Resource, retrieved May 19, 2020, six pages total, https://mathworld.wolfram.com/TrigonometryAngles.html.
Communication dated Nov. 21, 2019, issued by the United States Patent & Trademark Office in counterpart U.S. Appl. No. 15/265,286.

* cited by examiner

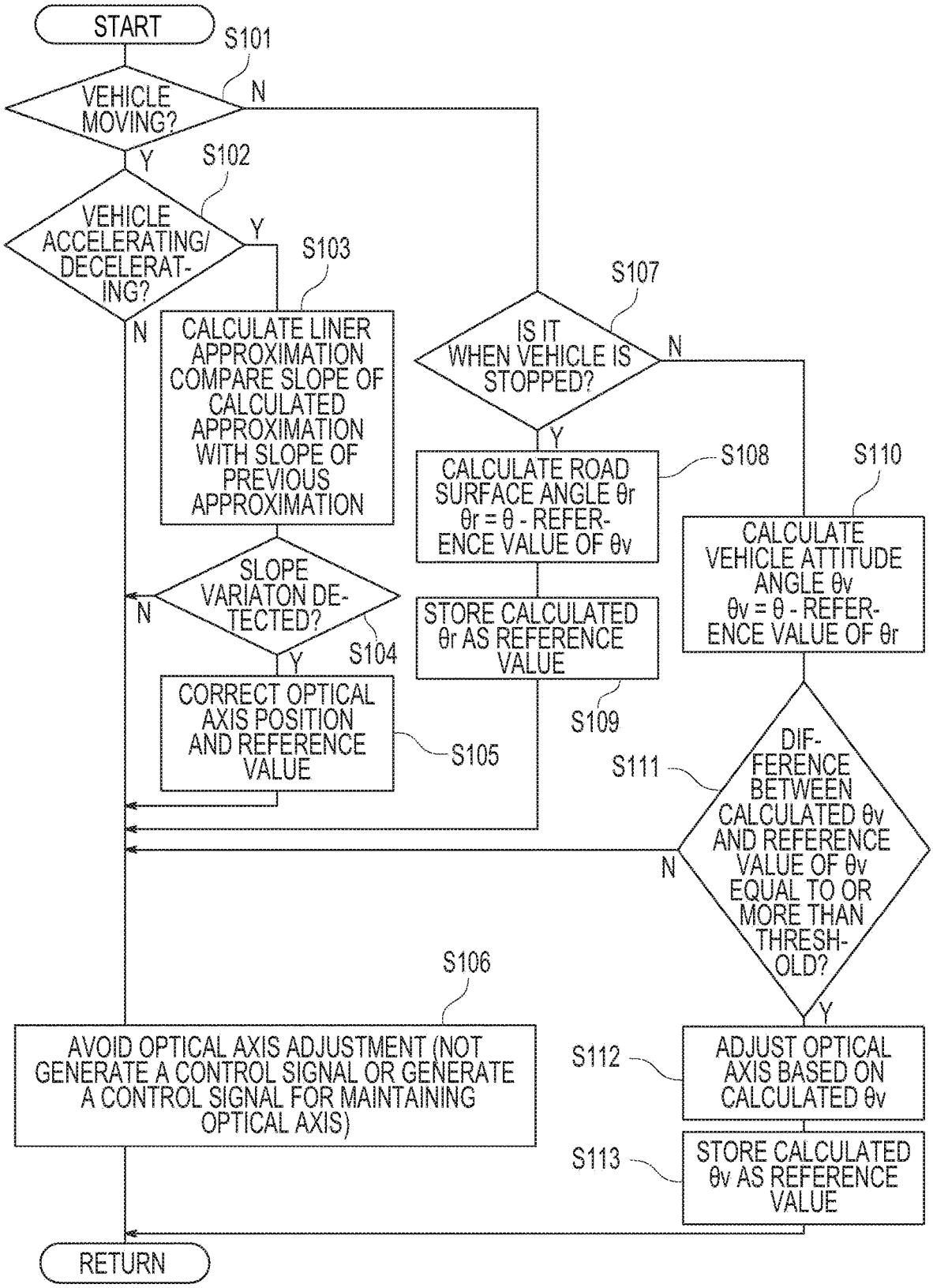
FIG. 5
AMENDED

AMENDED

VEHICLE LAMP CONTROLLER, VEHICLE LAMP SYSTEM, AND VEHICLE LAMP CONTROL METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

*This application is a Reissue Divisional of U.S. application Ser. No. 15/265,289 filed Sep. 14, 2016, which is an Application for Reissue of U.S. Pat. No. 8,838,343 issued on Sep. 16, 2014, which was filed as U.S. patent application Ser. No. 13/281,075 on Oct. 25, 2011, which* claims priority from Japanese Patent Application No. 2010-239736 filed on Oct. 26, 2010 and Japanese Patent Application No. 2011-153592 filed on Jul. 12, 2011[, the entire contents of which are incorporated herein by reference]. *This application is also a Reissue Application for U.S. Pat. No. 8,838,343 issued on Sep. 16, 2014, which was filed as U.S. patent application Ser. No. 13/281,075 on Oct. 25, 2011.*

FIELD OF INVENTION

The present invention relates to a vehicle lamp controller, a vehicle lamp system, and a vehicle lamp control method.

DESCRIPTION OF RELATED ART

In an auto-leveling control, a position of an optical axis of a vehicle headlamp is automatically adjusted in accordance with an inclination angle of a vehicle in the pitch direction to change the irradiating direction of the headlamp. Generally, in the auto-leveling control, a vehicle height sensor is used as a vehicle inclination detection device, and the optical axis position of the headlamp is adjusted in accordance with the pitch angle of the vehicle detected by the vehicle height sensor. According to other related art, the inclination detection device may include a gravity sensor (see, e.g., JP 2000-085459 A), a three-dimensional gyro sensor for detecting the inclination angle of the vehicle with respect to a horizontal plane (see, e.g., JP 2004-314856 A), an inclinometer for detecting the inclination angle of the vehicle with respect to the gravitational direction of the vehicle (see, e.g., JP 2001-341578 A), or an acceleration sensor for detecting the gravity acceleration of the vehicle (see, e.g., JP 2009-126268 A).

By using an acceleration sensor such as a gravity sensor or a three-dimensional gyro sensor as a vehicle inclination detection device, as compared with a vehicle height sensor, an auto-leveling system can be provided at low cost and in a weight saving manner.

In an auto-leveling control using an acceleration sensor, an inclination angle detected by the acceleration sensor is an inclination angle of a vehicle with respect to a horizontal plane, including an inclination angle of the road surface with respect to the horizontal plane and an inclination angle of the vehicle with respect the road surface. The inclination angle used in the auto-leveling control is the inclination angle of the vehicle with respect the road surface. Therefore, in the auto-leveling control using the acceleration sensor, information on the inclination angle of the vehicle with respect the road surface is extracted from the inclination angle of the road surface with respect to the horizontal plane.

BRIEF SUMMARY

Illustrative aspects of the present invention provide, for an auto-leveling control of a vehicle lamp using an acceleration sensor, a new technology for extracting information on an inclination angle of a vehicle with respect to a road surface from a detection by the acceleration sensor.

According to an illustrative aspect of the present invention, a vehicle lamp controller is provided. The controller includes a receiver configured to receive an acceleration information detected by an acceleration sensor, a control unit configured to derive a vehicle longitudinal direction acceleration and a vehicle vertical direction acceleration from the acceleration information, and to generate a control signal for instructing an adjustment of an optical axis of a vehicle lamp, based on a variation in a ratio between a temporal change amount of the vehicle longitudinal direction acceleration and a temporal change amount of the vehicle vertical direction acceleration during at least one of an acceleration and a deceleration of a vehicle, and a transmitter configured to transmit the control signal to an optical axis adjusting portion of the vehicle lamp.

According to another illustrative aspect of the present invention, a vehicle lamp system is provided. The vehicle lamp system includes a vehicle lamp having an adjustable optical axis, an acceleration sensor, and the controller described above.

According to yet another illustrative aspect of the present invention, a vehicle lamp control method is provided. The method includes obtaining an acceleration information detected by an acceleration sensor, deriving a vehicle longitudinal direction acceleration and a vehicle vertical direction acceleration from the acceleration information, calculating a variation in a ratio between a temporal change amount of the vehicle longitudinal direction acceleration and a temporal change amount of the vehicle vertical direction acceleration during at least one of an acceleration and a deceleration of a vehicle, and adjusting an optical axis of a vehicle lamp based on the ratio.

Other aspects and advantages of the invention will be apparent from the following description, the drawings and the claims.

BRIEF DESCRIPTION OF THE DRAWINGS

FIG. 5 is a flow chart of the auto-leveling control of a vehicle lamp system according to the first exemplary embodiment;

DETAILED DESCRIPTION

Hereinafter, exemplary embodiments of the present invention will be described in detail. However, the following exemplary embodiments do not limit the scope of the claimed invention. Features of the following exemplary embodiments and combinations of the features described below are not necessarily essential to the present invention.

Figure 1:
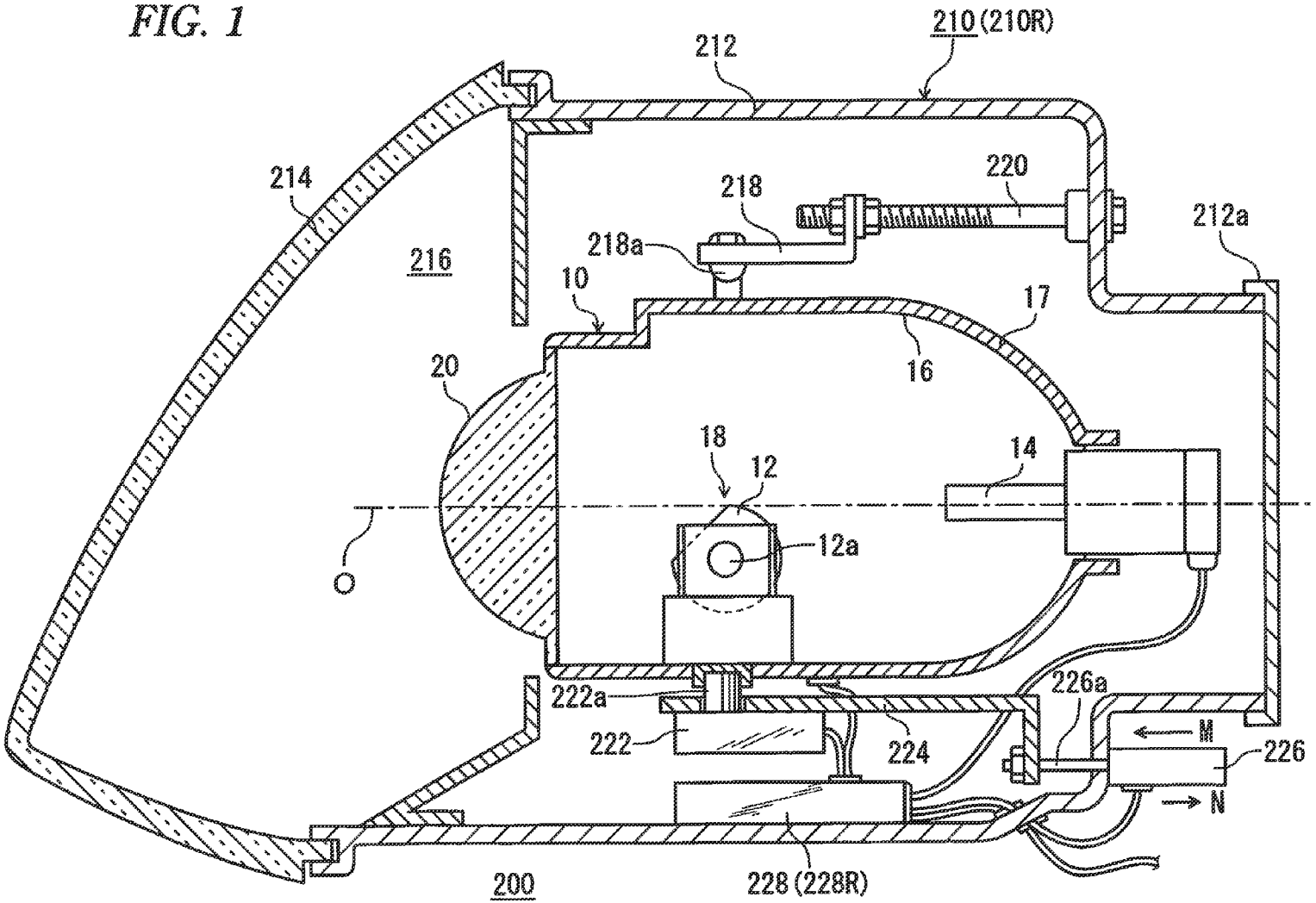
FIG. 1 is a schematic vertical sectional view of a vehicle lamp system according to an first exemplary embodiment of the present invention.

FIG. 1 is a schematic vertical sectional view of the internal structure of a vehicle lamp system according to an first exemplary embodiment of the invention. A vehicle lamp system 200 according to this exemplary embodiment is a light distribution variable headlamp system including a pair of right and left symmetrically configured headlamps disposed apiece on the right and left of a vehicle in the vehicle width direction. Since the right and left headlamps are substantially the same in structure except that they are arranged symmetrically right and left, description will be given herein below of the structure of the right headlamp 210R and thus the description of the left headlamp will be partially omitted. When describing the components of the left headlamp that are the same or similar to those of the right headlamp, for convenience of description, they are given the same reference signs.

The headlamp 210R includes a lamp body 212 having a front opening and a transparent cover 214 for covering the opening. The lamp body 212 includes removable cover 212a on its rear side, which is removed when, for example, replacing a light source 14. The lamp body 212 and transparent cover 214 together form a lamp chamber 216. In the lamp chamber 216, a lamp unit 10 (an example of a vehicle lamp) is accommodated to irradiate light forward from a vehicle.

The lamp unit 10 has a lamp bracket 218 having a pivot mechanism 218a serving as the pivot center of the lamp unit 10 in the vertical and horizontal directions. The lamp bracket 218 is threadedly engaged with an aiming adjustment screw 220 rotatably supported on the wall surface of the lamp body 212. Therefore, the lamp unit 10 can be fixed at such a given position within the lamp chamber 216 as can be determined according to the adjusted state of the aiming adjustment screw [22( )] *220* and[.] with such position as the reference, the attitude of the lamp unit 10 can be changed between a forwardly inclined attitude and a backwardly inclined attitude about the pivot mechanism 218a. Also, to the lower surface of the lamp unit 10 there is fixed the rotation shaft 222a of a swivel actuator 222 used to form a curved road light distribution variable headlamp or the like for illuminating the vehicle advancing direction when the vehicle is moving along the curved road. The swivel actuator 222 is fixed to a unit bracket 224.

To the unit bracket 224, there is connected a leveling actuator 226 disposed outside the lamp body 212. The leveling actuator 226 includes, for example, a motor capable of expanding and contracting a rod 226a in the directions M, N shown in FIG. 1. When the rod 226a is expanded in the direction M, the lamp unit 10 is swung about the pivot mechanism 218a to take the backward inclined attitude. Oppositely, when the rod 226a is contracted in the direction N, the lamp unit 10 is swung about the pivot mechanism 218a to take the forward inclined attitude. When the lamp unit 10 takes the backward inclined attitude, there can be made a leveling adjustment which directs the pitch angle of an optical axis O, that is, the vertical direction angle of the optical axis O upwardly. Also, when the lamp unit 10 takes the backward inclined attitude, there can be made a leveling adjustment which directs the pitch angle of the optical axis O downwardly.

On the inner wall surface of the lamp chamber 216 existing downwardly of the lamp unit 10, there is provided a irradiation controller 228 [(controller, control unit)] for carrying out the on/off control, light distribution pattern formation control, optical axis adjustment and the like of the lamp unit 10. In the case of FIG. 1, there is disposed a irradiation controller 228R for controlling the headlamp 210R. This irradiation controller 228R also controls the swivel actuator 222, leveling actuator 226 and the like. The irradiation controller 228R may also be disposed outside the headlamp 210R.

The lamp unit 10 may also include an aiming adjustment mechanism. For example, in the connecting portion between the rod 226a of the leveling actuator 226 and unit bracket 224, there may be disposed an aiming pivot mechanism (not shown) which serves as the center of oscillation in the aiming adjustment. Also, in the lamp bracket 218, there may be disposed two aiming adjustment screws 220 of the above type spaced from each other in the vehicle width direction. By rotating the two aiming adjustment screws 220, the lamp unit 10 can be swung vertically and horizontally about the aiming pivot mechanism to thereby be able to adjust the optical axis O vertically and horizontally. This aiming adjustment is carried out, for example, in the vehicle shipping time, in the vehicle safety check time, and in the replacement of the headlamp 210R. The headlamp 210R is adjusted to the attitude that is decided in design and, with this attitude as the reference, the light distribution pattern formation control and the optical axis position adjustment control are carried out.

The lamp unit 10 includes a shade mechanism 18 including a rotation shade 12, a light source 14, a lamp housing 17 with a reflector 16 supported on the inner wall thereof, and a projection lens 20. The light source 14 may be, for example, an incandescent lamp, a halogen lamp, a discharge lamp and an LED. In this exemplary embodiment, the light source 14 is a halogen lamp. The reflector 16 reflects light emitted from the light source 14. The light emitted from the light source 14 and the light reflected by the reflector 16 are in part guided through the rotation shade 12 to the projection lens 20. The rotation shade 12 is a cylindrical member rotatable about a rotation shaft 12a, while it includes a cutout portion cut out therefrom in the axial direction and multiple shade plates (not shown). When the cutout portion or shade plates are moved onto the optical axis O, a given light distribution pattern is formed. At least a portion of the reflector 16 is formed to have an elliptic spherical surface shape, and this elliptic spherical surface is set such that the section shape including the optical axis O of the lamp unit 10 can provide at least a portion of the elliptic shape. The elliptic spherical surface portion of the reflector 16 has a first focus substantially in the center of the light source 14 and a second focus on the rear focal plane of the projection lens 20.

The projection lens 20 is disposed on the optical axis O extending in the vehicle longitudinal direction. The light source 14 is disposed more backwardly of a rear focal plane which is a focal plane including the rear focus of the projection lens 20. The projection lens 20 is a planoconvex aspherical surface having a convex front surface and a flat rear surface, and projects a light source image formed on the rear focal plane, as a reversed image, on a virtual vertical screen ahead of the vehicle lamp system 200. Here, the lamp unit 10 is not limited to this structure. For example, the lamp unit 10 may be a reflector type lamp unit that does not have the projection lens 20.

Figure 2:
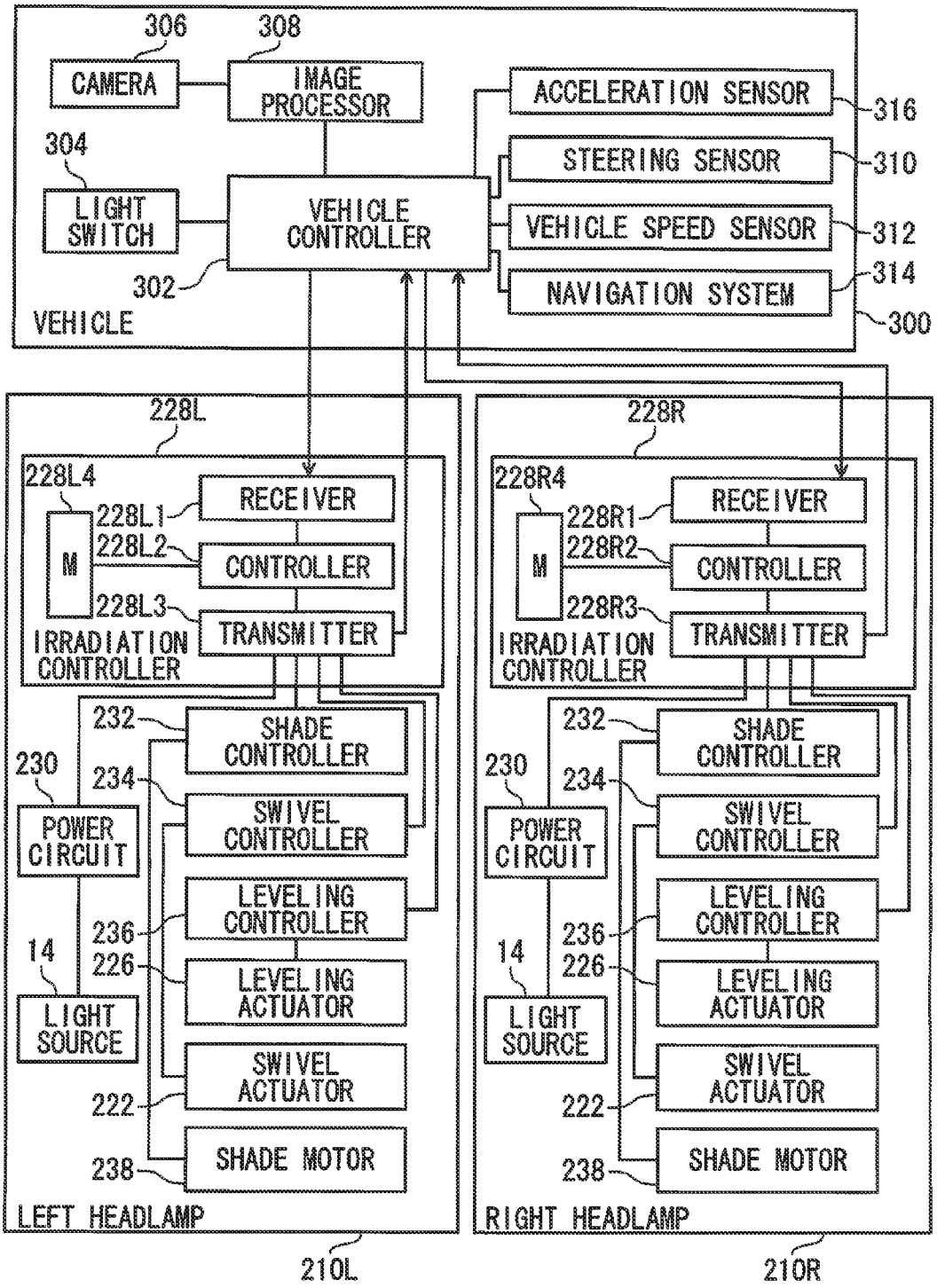
FIG. 2 is a functional block diagram illustrating an operation linkage between an irradiation controller of a headlamp and a vehicle controller of a vehicle.

FIG. 2 is a function block diagram of the irradiation controller of the above-structured headlamp and a vehicle controller provided on a vehicle. As described above, since the right headlamp 210R and left headlamp 210L are basically the same in structure, only the headlamp 210R will be described here, while omitting the description of the headlamp 210L.

The irradiation controller 228R of the headlamp 210R includes a receiver 228R1, a [control] *controller/control* unit 228R2, a transmitter 228R3 and a memory 228R4. The irradiation controller 228R controls a power circuit 230 according to information obtained from a vehicle controller 302 carried on a vehicle 300, thereby carrying out the turn-on control of the light source 14. Also, the irradiation controller 228R controls a shade controller 232, a swivel controller 234 and a leveling controller 236 ([a] *an* example of an optical axis adjusting portion) according to information obtained from the vehicle controller 302. Various kinds of information transmitted from the vehicle controller 302 are received by the receiver 228R1, while the [control] *controller/control* unit 228R2 generates various control signals from this information, [as the arises,] together with information stored in a memory 228R4. These control signals are transmitted by the transmitter 228R3 to the power circuit 230 of the lamp unit 10, shade controller 232, swivel controller 234, leveling controller 236 and the like. The memory 228R4 may be, for example, a nonvolatile memory.

The shade controller 232 rotationally controls a motor 238 connected to the rotation shaft 12a of the rotation shade 12 to thereby move a desired shade plate or the cutout portion onto the optical axis O. The swivel controller 234 controls the swivel actuator 222 to adjust the angle of the optical axis O of the lamp unit 10 with respect to a vehicle width direction (right and left directions). Specifically, when the vehicle makes a turn, for example, when going along a curve, or when turning to the right or left, the controller 232 directs the optical axis O of the lamp unit 10 in a direction where the vehicle is going to move from now. The leveling controller 236 controls the leveling actuator 226 to adjust the optical axis O of the lamp unit 10 with respect to the vehicle vertical direction (a pitch angle direction). For example, it adjusts the attitude of the lamp unit 10 according to the forwardly or backwardly inclined attitude of the vehicle when increasing or decreasing a carrying load or when increasing or decreasing the number of occupants, thereby adjusting the arrival distance of the forward irradiation light to the optimum distance. The vehicle controller 302 supplies similar information to the headlamp 210L as well, while the irradiation controller 228L [(controller, control unit)] provided in the headlamp 210L executes similar control to the irradiation controller 228R.

Light distribution patterns to be formed by the headlamps 210L, 210R can be switched according to the operation contents of the light switch 304 by a driver. In this case, according to the operation of the light switch 304, the irradiation controllers 228L and 228R control the motor 238 through the shade controller 232 to determine the light distribution pattern to be formed by the lamp unit 10. Or, the headlamps 210L, 210R may not be controlled by the operation of the light switch 304 but may be automatically controlled such that they can detect the state of the vehicle 300 or vehicle peripheral conditions using various sensors to thereby form the optimum light distribution pattern. This light distribution pattern automatic formation control may be carried out, for example, when the light distribution pattern automatic formation control is instructed by the light switch 304.

In order to detect a target object such as a vehicle ahead or an oncoming vehicle, a camera 306 such as a stereo camera is connected to the vehicle controller 302. The image processor 308 executes a given image process such as a target object recognition process on image frame data pictured by the camera 306, and the recognition results are supplied to the vehicle controller 302. Also, the vehicle controller 302 is also capable of obtaining information supplied from a steering sensor 310, a vehicle speed sensor 312, a navigation system 314, an acceleration sensor 316 and the like respectively carried on the vehicle 300. Thus, according to the moving state and attitude of the vehicle 300, the irradiation controllers 228L, 228R can select the light distribution pattern to be formed and can change the direction of the optical axis O.

Figure 3A:
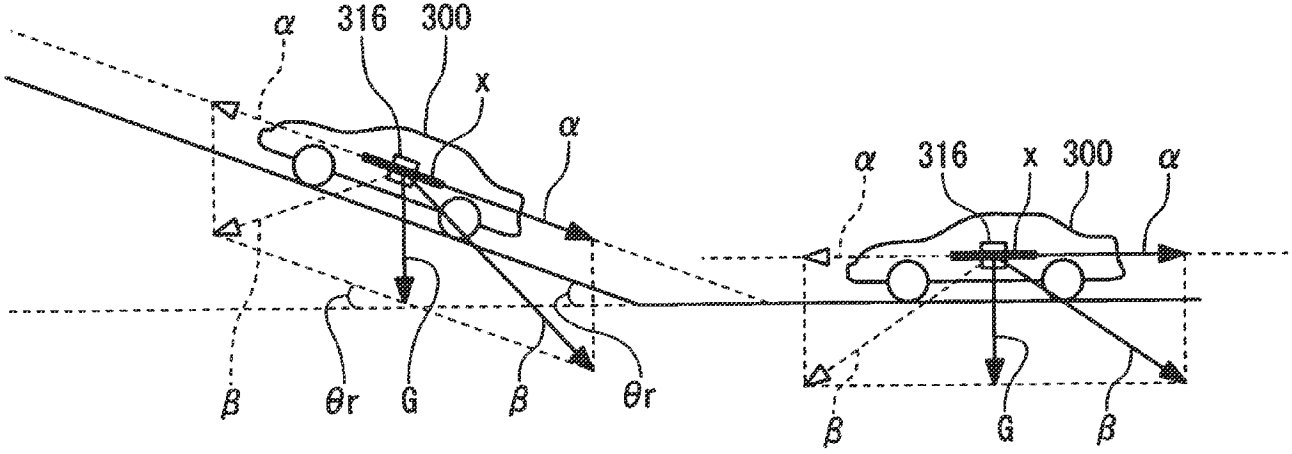
FIGS. 3A and 3B are diagrams illustrating a relationship between a direction of a motion acceleration vector of a vehicle and a vehicle attitude angle.
Figure 3B:
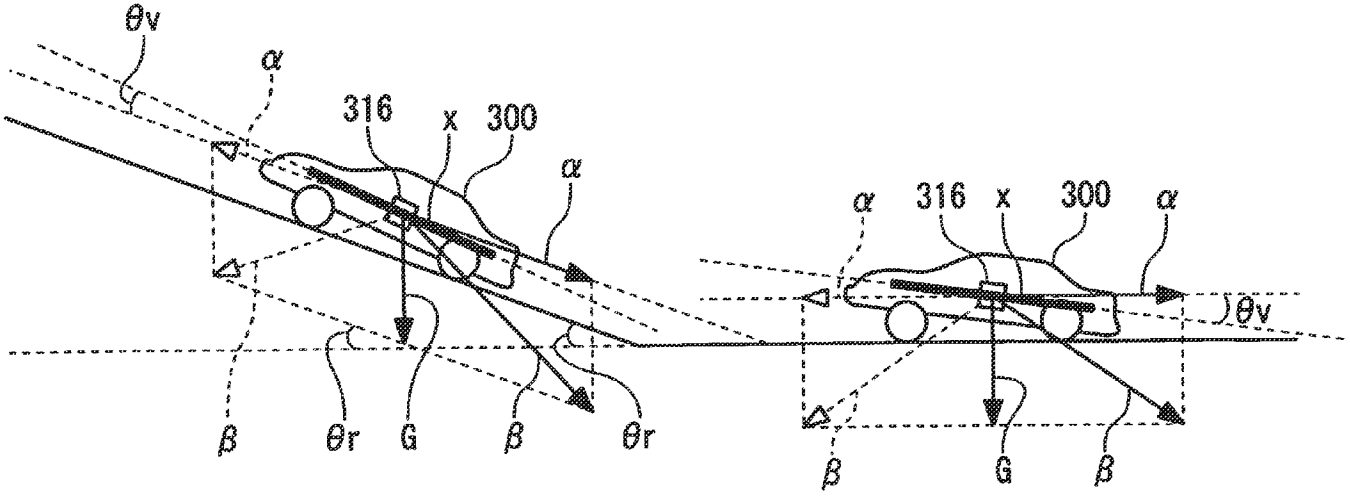
Figure 4:
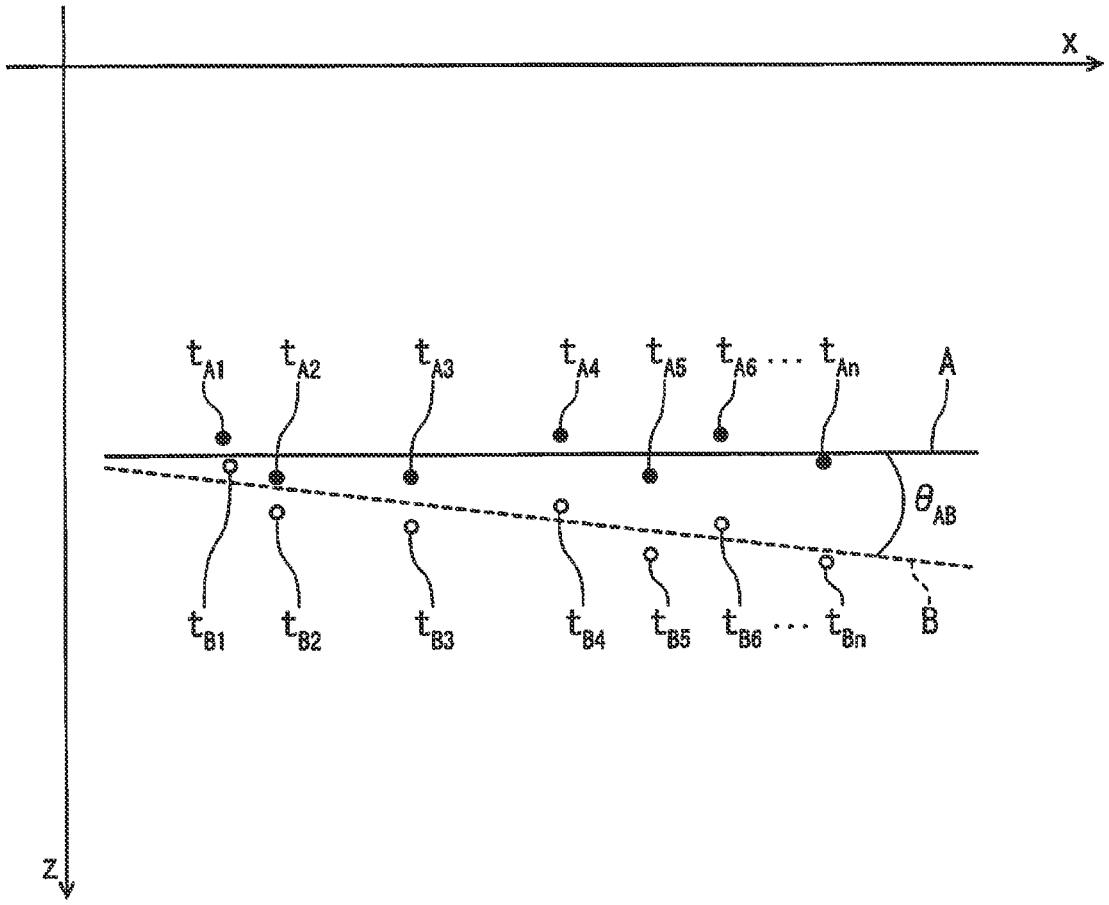
FIG. 4 is a graph showing a relationship between a vehicle longitudinal direction acceleration and a vehicle vertical direction acceleration.

Next, description will be given below specifically of the auto-leveling control that is carried out by the above structured vehicle lamp system 200. FIGS. 3A and 3B are diagrams illustrating the relationship between a direction of a vehicle motion acceleration vector and a vehicle attitude angle. FIG. 3A shows a state where a vehicle attitude angle θv (which will be discussed later) remains unchanged, whereas FIG. 3B shows a state where the vehicle attitude angle θv has changed. In FIGS. 3A and 3B, a motion acceleration vector [a] α and a resultant acceleration vector β (which are generated when the vehicle 300 advances) are respectively shown by solid line arrows, whereas a motion acceleration vector [a] α and a resultant acceleration vector β (which are generated when the vehicle 300 decelerates or backs) are respectively shown by broken line arrows. FIG. 4 is a graph of the relationship between the vehicle longitudinal direction acceleration and vehicle vertical direction acceleration.

For example, when a baggage is carried in the baggage room of the rear portion of the vehicle or when an occupant sits on the rear seat, the vehicle takes the backward inclined attitude; and, when the baggage has been removed or when the occupant has got off the vehicle, the vehicle inclines forward from the backward inclined attitude. The irradiation direction of the lamp unit 10 also varies according to the change of the attitude of the vehicle 300 and thus the forward irradiation distance increases or decreases accordingly. The irradiation [control unit] *controller* 228L, 228R receive the values detected by the acceleration sensor 316 through the vehicle controller 302, controls the leveling actuator 226 through the leveling controller 236 to determine the pitch angle of the optical axis O as an angle corresponding to the vehicle attitude. Thus, by carrying out the auto-leveling control which makes the leveling adjustment of the lamp unit 10 real time according to the vehicle attitude, even when the vehicle attitude changes according to the state of use of the vehicle 300, the arrival distance of the forward irradiation can be adjusted to the optimum.

The acceleration sensor 316 is, for example, a three-axis acceleration sensor having an X axis, a Y axis and a Z axis which are perpendicular to each other. The acceleration sensor 316 is mounted on the vehicle 300 such that the X axis extends along the longitudinal axis of the vehicle 300, Y axis extends along the right and left axis of the vehicle 300 and Z axis extends along the vertical axis of the vehicle 300 respectively. The acceleration sensor 316 detects the inclination of the vehicle 300 with respect to the gravity acceleration vector G and outputs the numerical values of the respective axis components of the gravity acceleration vector G in the three axis directions. That is, the acceleration sensor 316 can detect, as a vector, the inclination angle of a vehicle with respect to a horizontal plane, i.e. a summed angle θ including a road surface angle θr (a first angle), namely, the inclination angle of a road surface with respect to the horizontal plane and a vehicle attitude angle θv (a second angle), namely, the inclination angle of the vehicle with respect to the road surface. Also, the acceleration sensor 316, while the vehicle is moving, detects a resultant acceleration vector β in which the gravity acceleration vector G and a motion acceleration vector [a] α generated due to the motion of the vehicle 300 are combined together, and outputs the numerical values of the respective axis components of the resultant acceleration vector β in the three axis directions. Here, the road surface angle θr, vehicle attitude angle θv and summed angle θ are respectively angles in the vertical direction of the X axis, in other words, the pitch direction angles of the vehicle 300. Here, in the following description, the component of the acceleration sensor 316 in the Y axis direction, that is, the rolling direction angle of the vehicle 300 is not taken into consideration. The acceleration sensor 316 may also be mounted on the vehicle 300 in any other orientation. In this case, the numerical values of the respective components of the X axis, Y axis and X axis output from the acceleration sensor 316 are respectively converted to the components of the longitudinal axis, lateral axis and vertical axis of the vehicle by the irradiation controller 228R.

The object of the auto-leveling control is to absorb variations in the forward irradiation distance of the vehicle lamp caused by variations in the vehicle pitch direction inclination angle to thereby keep the forward arrival distance of the irradiation light to the optimum distance. Therefore, the inclination angle of the vehicle necessary for the auto-leveling control is the vehicle attitude angle θv. That is, it is desirable that the optical axis position of the lamp unit 10 be adjusted when the vehicle attitude angle θv changes, and that the optical axis position of the lamp unit 10 be maintained when the road surface angle θr changes. In order to realize this, the vehicle attitude angle θv is extracted from the summed angle θ obtained from the acceleration sensor 316.

The vehicle 300 moves parallel to the road surface. Therefore, the motion acceleration vector α provides a vector parallel to the road surface regardless of the vehicle attitude angle θv. Also, shown in FIG. 3A, when the vehicle attitude angle θv of the vehicle 300 is 0°, theoretically, the X axis of the acceleration sensor 316 (or the longitudinal axis of the vehicle 300) is parallel to the road surface and, therefore, the motion acceleration vector α provides a vector parallel to the X axis of the acceleration sensor 316. Thus, when the magnitude of the motion acceleration vector α is varied due to the acceleration or deceleration of the vehicle, the locus of the leading end of the resultant acceleration vector β to be detected by the acceleration sensor 316 provides a straight line parallel to the X axis. On the other hand, as shown in FIG. 3B, when the vehicle attitude angle θv of the vehicle 300 is not 0°, the X axis of the acceleration sensor 316 is shifted obliquely with respect to the road surface and thus the motion acceleration vector α provides a vector extending obliquely with respect to the X axis of the acceleration sensor 316. Therefore, when the magnitude of the motion acceleration vector α is varied due to the acceleration or deceleration of the vehicle, the locus of the leading end of the resultant acceleration vector β provides a straight line inclined with respect to the X axis.

In this case, the irradiation controller 228R receives through the receiver 228R1 the vehicle longitudinal direction acceleration and the vehicle vertical direction acceleration from the acceleration sensor 316. The [control] *controller/control* unit 228R2 calculates a ratio between the temporal change amount of the vehicle longitudinal direction acceleration and the temporal change amount of the vehicle vertical direction acceleration at least in one of the acceleration and deceleration of the vehicle 300. For example, the irradiation controller 228R, as shown in FIG. 4, plots points corresponding to the values detected by the acceleration sensor 316 over a time during at least one of the acceleration and a deceleration of the vehicle on a coordinate system having a first axis (x axis) representing the vehicle longitudinal direction acceleration and a second axis (z axis) representing the vehicle vertical acceleration. Points $t_{A1}$, $t_{A2}$, . . . , $t_{An}$ denote the values detected by the acceleration sensor 316 at timings $t_1$, $t_2$, . . . , $t_n$ in a state shown in FIG. 3A. Points $t_{B1}$, $t_{B2}$, . . . , $t_{Bn}$ denote the values detected by the acceleration sensor 316 at timings $t_1$, $t_2$, . . . , $t_n$ in a state shown in FIG. 3B. The irradiation controller 228R calculates the slope of a straight line or a vector obtained from at least two of the points as the ratio described above. In this exemplary embodiment, the irradiation controller 228R obtains a linear approximation A, B with respect to the plotted points $t_{A1}$, $t_{A2}$, . . . , $t_{An}$, $t_{B1}$, $t_{B2}$, . . . , $t_{Bn}$ using the method of least squares or the like, and calculates the slope of the linear approximation A, B as the ratio.

When the vehicle attitude angle θv is 0°, a linear approximation A parallel to the x axis is obtained from the values detected by the acceleration sensor 316. That is, the slope of the linear approximation A is 0. When the vehicle attitude angle θv is not 0°, a linear approximation B having a slope corresponding to the vehicle attitude angle θv is obtained. Therefore, by measuring a variation in the ratio between the temporal change amounts of the vehicle longitudinal direction acceleration and the vehicle vertical direction acceleration during the acceleration or the deceleration of the vehicle 300, from the values detected by the acceleration sensor 316, a variation in the vehicle attitude angle θv can be obtained. By using this information on the variation in the vehicle attitude angle θv, an auto-leveling control can be realized with high accuracy.

The vehicle lamp system 200 according to this exemplary embodiment, using the information about the vehicle attitude angle θv that can be obtained by detecting the above ratio variation, carries out the following auto-leveling control. That is, firstly, the vehicle 300 is set in a basic condition in which the vehicle 300 is placed on a horizontal plane, for example, in the manufacturing factory of a vehicle manufacturer or in the repair shop of a dealer. The basic condition is also a condition in which only one person is in the vehicle 300, sitting on the driver's seat of the vehicle 300, or a condition in which the vehicle 300 is vacant. Through the switch operation of the initialization processing apparatus of the factory or through the communication of a CAN (Controller Area Network) for connecting together the irradiation controller [228F] *228R* and acceleration sensor 316 through the vehicle controller 302, an initialization signal is transmitted to the irradiation controller 228R. The initialization signal transmitted to the irradiation controller 228R is received by the receiver 228R1 and is then transmitted to the [control] *controller/control* unit 228R2. The [control] *controller/control* unit 228R2, [on] *upon* receiving the initialization signal, uses the values output from the acceleration sensor 316 and received by the receiver 228R1 as reference inclination angles, *and* carries out an initial aiming adjustment. Also, the [control] *controller/control* unit 228R2 records the values output from the acceleration sensor 316 as the reference value of the road surface angle θr (θr=0') and the reference value of the vehicle attitude angle θv (θv=0°) into the memory 228R4 to thereby store these reference values.

While a vehicle is moving, the vehicle attitude angle θv is rarely varied due to an increase or a decrease in the loading on the vehicle or in the number of occupants in the vehicle. Thus, a variation in the summed angle θ while the vehicle is moving can be regarded as a variation in the road surface angle θr. Accordingly, when the summed angle θ varies while the vehicle is moving, the [control] *controller/control* unit 228R2 prevents the generation of a control signal for instructing the optical axis adjustment. Alternatively, the [control] *controller/control* unit 228R2 may generate a control signal for instruction to maintain of the optical axis position in response to a variation in the summed angle θ while the vehicle is moving, and the transmitter 228R3 may transmit it to the leveling controller 236. Whether the vehicle 300 is moving or not can be determined by, for example, a vehicle speed obtained from the vehicle speed sensor 312. "While the vehicle is moving" can be defined as, for example, from the time when the vehicle speed obtained from the vehicle speed sensor 312 exceeds 0 to the time when the vehicle speed obtained from the vehicle speed sensor 312 becomes 0. "While the vehicle is moving" can optionally be defined based on an experiment or simulation by a designer.

When the vehicle is stopped, the control unit 228R2 subtracts the reference value of the vehicle attitude angle θv, which is read out from the memory 228R4, from the current summed angle θ detected by the acceleration sensor 316 to calculate the road surface angle θr. The road surface angle θr is recorded into the memory 228R4 as the new reference value of the road surface angle θr. "When the vehicle is stopped" is, for example, the time when the value detected by the acceleration sensor 316 becomes stable after the vehicle speed obtained by the vehicle speed sensor 312 became 0. The reason why it is the time when the value detected by the acceleration sensor 316 becomes stable is that it takes a little time for the attitude of the vehicle 300 to become stable after the vehicle 300 stops and thus, in a state where the vehicle attitude is not stable, it is difficult to detect the accurate summed angle θ. The "the time when the value becomes stable" may be defined as the time when the variations in the values detected by the acceleration sensor 316 per unit time becomes equal to or less than a threshold, or as the time when a given period of time has elapsed after the vehicle speed detected by the vehicle speed sensor 312 became 0. The time "when the vehicle is stopped", the "threshold" and the "given period of time" can optionally be set based on an experiment or simulation by a designer.

While the vehicle is stopped, it is rare that the vehicle 300 moves and the road surface angle θr changes. Thus, a variation in the summed angle θr while the vehicle is stopped can be regarded as a variation in the vehicle attitude angle θv. Thus, when the summed angle θ varies while the vehicle is stopped, the [control] *controller/control* unit 228R2, using the vehicle attitude angle θv obtained from the values detected by the acceleration sensor 316 and the reference value of the road surface angle θr read out from the memory 228R4, generates a control signal for instructing the optical axis adjustment. More specifically, while the vehicle is stopped, the [control] *controller/control* unit 228R2 calculates the vehicle attitude angle θv repetitively at given timings. The vehicle attitude angle θv can be obtained by subtracting the road surface angle θr stored in the memory 228R4 from the current summed angle θ received from the acceleration sensor 316. When the difference between the calculated vehicle attitude angle θv and the reference value of the vehicle attitude angle θv stored in the memory 228R4 is equal to or more than a threshold, the [control] *controller/control* unit 228R2 generates a control signal according to the newly obtained vehicle attitude angle θv. This can avoid frequent optical axis adjustments and, as a result, the control burden of the [control] *controller/control* unit 228R2 can be reduced and the life of the leveling actuator 226 can be extended. The thus generated control signal is transmitted to the leveling controller 236 by the transmitter 228R3, whereby an optical axis adjustment according to the control signal can be carried out. The calculated vehicle attitude angle θv is recorded into the memory 228R4 as a new reference value.

"While the vehicle is stopped" means, for example, a period from the time when the value detected by the acceleration sensor 316 becomes stable to the time when the vehicle starts moving. The "time when the vehicle starts moving" means, for example, the time when the vehicle speed detected by the [acceleration] *vehicle speed* sensor 312 exceeds 0. "While the vehicle is stopped" can optionally be defined based on an experiment or simulation by a designer.

During at least one of the acceleration and deceleration of the vehicle, for example, for a given time when the vehicle starts or stops, the [control] *controller/control* unit 228R2 records the values output from the acceleration sensor 316. The [control] *controller/control* unit 228R2 plots the recorded output values on a coordinate system having a first axis representing the vehicle longitudinal direction acceleration and a second axis representing the vehicle vertical direction acceleration, and using the method of least square, calculates linear approximations continuously or at every given time. The [control] *controller/control* unit 228R2 generates a control signal for instructing the optical axis adjustment of the lamp unit 10 according to a variation in the slope of the obtained linear approximations, thereby correcting the optical axis position. The [control] *controller/control* unit 228R2 also corrects the reference value of the vehicle attitude angle θv stored in the memory 228R4. For example, the [control] *controller/control* unit 228R2 compares the currently obtained slope of the linear approximation with the previously obtained slope of the linear approximation and, when there is a variation in the slope of the linear approximation, carries out a correction process according to this slope variation.

For example, where the vehicle attitude angle θv stored in the memory 228R4 is p° *and* the accumulated value of variations in the slope of the linear approximation from the first calculation is q°, or where the variation amount of the vehicle attitude angle θv while the vehicle is stopped[,] (that is, a difference between the vehicle attitude angle θv stored when the vehicle is stopped and the vehicle attitude angle θv stored when the vehicle starts moving) is p°, and a slope difference between a linear approximation calculated when the vehicle previously started moving and a linear approximation calculated when the vehicle starts moving is q°, the [control] *controller/control* unit 228R2 generates a control signal for adjusting the optical axis position only by an error (p−q)° of the vehicle attitude angle θv and the transmitter 228R3 transmits this control signal. Also, the [control]

*controller/control* unit 228R2 corrects the reference value of the vehicle attitude angle θv stored in the memory 228R4 only by (p−q)°. Thus, as described above, by rewriting the reference values of the road surface angle θr and vehicle attitude angle θv repetitively, there can be prevented a possibility that the detection errors or the like of the acceleration sensor 316 can be accumulated to thereby deteriorate the accuracy of the auto-leveling control. Or, the accuracy deterioration of the auto-leveling control can be reduced.

The method for correcting the optical axis position and the reference value of the vehicle attitude angle θv may also be as follows. That is, when there cannot be avoided disturbances such as the inclination of the vehicle attitude due to the acceleration or deceleration of the vehicle 300 and the inclination of the vehicle attitude due to the turning of the vehicle 300, there is a possibility that the amount of variations in the slope of the linear approximation can deviate greatly from the amount of variations in the vehicle attitude angle θv. In this case, even when the optical axis position and the reference value of the vehicle attitude angle θv are corrected by the variation amount of the slope of the linear approximation, they deviate from the actual vehicle attitude angle θv. Also, since the varied slope of the linear approximation raises a high possibility that the actual vehicle attitude angle θv deviates from the reference value stored, there is a possibility that, even when the optical axis is adjusted using the reference value stored, the auto-leveling control cannot be carried out with high accuracy. Therefore, when a variation in the above-mentioned ratio or in the slope of the linear approximation is detected, the [control] *controller/control* unit 228R2, as the correction control of the optical axis position according to this slope variation, moves the optical axis position nearer to the horizontal direction or to the initial position to thereby draw the reference value of the vehicle attitude angle θv nearer to 0°. Due to this, even when the optical axis position of the lamp unit 10 cannot be made to follow a variation in the vehicle attitude angle θv with high accuracy, there can be realized a failsafe function which moves the optical axis position nearer to the horizontal direction or to the initial position to thereby secure the visibility of a driver.

Here, the [control] *controller/control* unit 228R2 may also be structured such that, when a difference between the calculated vehicle attitude angle θv and the reference value of the vehicle attitude angle θv stored in the memory 228R4 is equal to or more than a threshold, it stores the calculated vehicle attitude angle θv into the memory 228R4 as a new reference value. Similarly, the [control] *controller/control* unit 228R2 may also be structured such that, when a difference between the calculated road surface angle θr and the reference value of the road surface angle θr stored in the memory 228R4 is equal to or more than a threshold, it stores the calculated road surface angle θr into the memory 228R4 as a new reference value. This can prevent the reference value of the road surface angle θr or vehicle attitude angle θv from being rewritten frequently. Also, the [control] *controller/control* unit 228R2 may also calculate the road surface angle θr when the summed angles θ in the start and stop times of the vehicle 300 differ from each other. This can reduce the control burden of the [control] *controller/control* unit 228R2.

Also, the [control] *controller/control* unit 228R2 may also previously store the values detected by the acceleration sensor 316 in the acceleration and deceleration times of the vehicle 300 from one-time start to stop thereof and, in the vehicle stop time or the like, may calculate a linear approximation to thereby perform the above-mentioned correction process.

FIG. 5 is a flow chart of the auto-leveling control of the vehicle lamp system according to the first exemplary embodiment. In the flow chart of FIG. 5, the processing procedures of the respective parts are designated using combinations of S (STEP) and numerals. Also, in a process designated by a combination of S and a numeral, there is carried out some check process. When the check result thereof is positive, Y (YES) is added to designate, for example, (S101; Y) and, oppositely, when the check result is negative, N (NO) is added to designate, for example, (S101; N). For example, in a state where an instruction for execution of an auto-leveling control mode is given by the light switch 304, when the ignition is turned on, this flow is carried out repetitively at a given timing by the irradiation controller 228R ([control] *controller/control* unit 228R2) and, when the ignition is turned off, it is ended.

Firstly, the [control] *controller/control* unit 228R2 determines whether a vehicle is moving (S101). If it is determined that the vehicle is moving (S101; Y), the [control] *controller/control* unit 228R2 determines whether the vehicle is in an accelerating or decelerating mode or not (S102). The acceleration or deceleration of the vehicle can be detected, for example, from the value detected by the acceleration sensor 316, or from whether an accelerator pedal or a brake pedal (neither of them are shown) is pressed down. If it is determined that the vehicle is in the accelerating or decelerating mode (S102; Y), the [control] *controller/control* unit 228R2 calculates a linear approximation from the multiple values output from the acceleration sensor 316 and compares the slope of the currently calculated linear approximation with the slope of the previously calculated linear approximation (S103). The [control] *controller/control* unit 228R2 determines whether there is a variation in the slope of the linear approximation (S104). If it is determined that there is a variation in the slope of the linear approximation (S104; Y), the [control] *controller/control* unit 228R2 generates a control signal for instructing the optical axis adjustment to thereby correct the optical axis position and the reference value of the vehicle attitude angle θv (S105). After that, even when a summed angle θ detected by the acceleration sensor 316 has varied, the [control] *controller/control* unit 228R2 does not generate a control signal for instructing the optical axis adjustment but avoids the optical axis adjustment, ending this routine. If it is determined that the vehicle is not in an accelerating or decelerating mode (S102; N) [and] *or* that there is no variation in the slope of the linear approximation (S104; N), the [control] *controller/control* unit [22882] *228R2* also avoids the optical axis adjustment (S106) and ends this routine.

If it is determined that the vehicle is not moving (S101; N), the [control] *controller/control* unit 228R2 determines whether *it is when* the vehicle is stopped (S107). If it is determined that *it is when* the vehicle is stopped (S107; Y), the [control] *controller/control* unit 228R2 subtracts the reference value of the vehicle attitude angle θv from the current summed angle θ to calculate the road surface angle θr (S108) and stores the calculated road surface angle θr into the memory 228R4 as a new reference value (S109). The [control] *controller/control* unit 228R2 then avoids the optical axis adjustment (S106) and ends this routine.

If it is determined that *it is not when* the vehicle is [not] stopped (S107; N)[,] because the vehicle is actually not moving, [and] the [control] *controller/control* unit 228R2 subtracts the reference value of the road surface angle θr from the current summed angle θ to calculate the vehicle attitude angle θv (S110). Next, the [control] *controller/control* unit 228R2 determines whether a difference between the calculated vehicle attitude angle θv and the reference value of the vehicle attitude angle θv is equal to or more than a threshold (S111). If it is determined that the difference is less than the threshold (S111; N), the [control] *controller/control* unit 228R2 avoids the optical axis adjustment (S106) and ends this routine. If it is determined that the difference is equal to or more than the threshold (S111; Y), the [control] *controller/control* unit 228R2 adjusts the optical axis position according to the calculated vehicle attitude angle θv (S112). The [control] *controller/control* unit 228R2 then stores the calculated vehicle attitude angle θv into the memory 228R4 as a reference value (S113) and ends this routine. If it is determined that the difference is equal to or more than the threshold (S111; Y), the [control] *controller/control* unit 228R2 adjusts the optical axis position according to the calculated vehicle attitude angle θv (S112). The [control] *controller/control* unit 228R2 then stores the calculated vehicle attitude angle θv into the memory 228R4 as a reference value (S113) and ends this routine.

Here, in the left headlamp 210L, the irradiation controller 228L, more specifically, the [control] *controller/control* unit 228L2, carries out similar control. Alternatively, one of the irradiation [portions] *controllers* 228L and 228R may calculate the vehicle attitude angle θv and road surface angle θr, while the other may obtain the calculated vehicle attitude angle θv and road surface angle θr to adjust the optical axis O.

While the vehicle is moving, generally, the period during which the vehicle 300 maintains its speed constant is short. Thus, it can be presumed that, most of the time during its movement, the vehicle is accelerating or decelerating. Therefore, it is possible to omit Step S102 for checking whether the vehicle 300 is accelerating or decelerating.

As described above, the vehicle lamp system 200 according to this exemplary embodiment receives an acceleration information from the acceleration sensor 316 in such a form that a vehicle longitudinal direction acceleration and a vehicle vertical direction acceleration are [drivable] *derivable* from the acceleration information, and adjusts the optical axis of the lamp unit 10 based on a variation in the ratio between the temporal change amount of the acceleration in the vehicle longitudinal direction and the temporal change amount of the acceleration in the vehicle vertical direction during at least one of the acceleration and deceleration of the vehicle 300. Thus, the vehicle lamp system 200 according to this exemplary embodiment obtains information about the vehicle attitude angle θv using a new extraction method which obtains a variation in the vehicle attitude angle θv from a variation in the ratio between the temporal change amount of the acceleration in the vehicle longitudinal direction and the temporal change amount of the acceleration in the vehicle vertical direction during the acceleration or deceleration of the vehicle. That is, the vehicle lamp system 200 according to this exemplary embodiment obtains information about the vehicle attitude angle θv from the plot characteristic of the acceleration sensor 316. Therefore, with use of the vehicle lamp system 200 according to this exemplary embodiment, there can be provided a new technology which extracts information about the vehicle attitude angle θv from the summed angle θv detected by the acceleration sensor 316.

Further, according to the vehicle lamp system 200 described above, [when] the summed angle θ varies while the vehicle is moving[, a] *due to a road surface situation. A* road surface angle θr is derived from the varied summed angle θ *at a time when the vehicle is stopped* and the reference value of the vehicle attitude angle θv *and* the stored reference value of the road surface angle θr is rewritten, and when the summed angle θ varies while the vehicle is stopped, a vehicle attitude angle θv is derived from the varied summed angle θ and the reference value of the road surface angle θr and the stored reference value of the vehicle attitude angle θv is rewritten. During the acceleration or the deceleration of the vehicle 300 and using information about the vehicle attitude angle θv extracted by the above method, the vehicle lamp system 200 corrects the optical axis position of the lamp unit 10 *and the reference value of the vehicle attitude angle θv stored in the memory 228R4*. Therefore, the vehicle lamp system 200 can carry out auto-leveling control using an acceleration sensor with high accuracy.

A vehicle lamp system 200 according to a second exemplary embodiment is a system which derives a vehicle attitude angle θv from a ratio between the temporal change amount of the acceleration in the vehicle longitudinal direction and the temporal change amount of the acceleration in the vehicle vertical direction and, using the derived vehicle attitude angle θv, carries out an optical axis adjustment. Now, description will be given below of this exemplary embodiment. The components of this vehicle lamp system 200 according to the second exemplary embodiment, that are similar to those of the first exemplary embodiment, are given the same reference signs, and the description thereof will be omitted.

The vehicle lamp system 200 according to this exemplary embodiment, using information about the vehicle attitude angle θv to be obtained by detecting the above-mentioned variation in the ratio, carries out the following auto-leveling control. That is, firstly, the vehicle 300 set in a basic condition in which the vehicle 300 moves on a horizontal plane, for example, in the manufacturing factory of a vehicle manufacturer or in the repair shop of a dealer. In this basic condition, the vehicle 300 is accelerated or decelerated. As an initialization process, the [control] *controller/control* unit 228R2 receives acceleration information from the acceleration sensor 316 and calculates a ratio between the temporal change amount of the acceleration in the vehicle longitudinal direction and the temporal change amount of the acceleration in the vehicle vertical direction during at least one of the acceleration and deceleration of the vehicle 300. The [control] *controller/control* unit 228R2 stores the calculated ratio into the memory 228R4 as a reference value of the ratio.

When the vehicle 300 is actually in use, the [control] *controller/control* unit 228R2 calculates a ratio between the temporal change amount of the acceleration in the vehicle longitudinal direction and the temporal change amount of the acceleration in the vehicle vertical direction during at least one of the acceleration and deceleration of the vehicle 300. The [control] *controller/control* unit 228R2 obtains a vehicle attitude angle θv from the reference value of the ratio previously stored in the initialization process and the current ratio, and carries out an optical axis adjustment using the obtained vehicle attitude angle θv.

For example, the [control] *controller/control* unit 228R2, in the initialization process, plots points corresponding to the values detected by the acceleration sensor 316 on a coordinate system having a first axis representing the vehicle longitudinal direction acceleration and a second axis representing the vehicle vertical direction acceleration, obtains a reference linear approximation from the plotted points, and calculates the slope of this reference linear approximation as the reference value of the ratio. When the vehicle is in actual use, the [control] *controller/control* unit 228R2 records, for example, for a given period of time when the vehicle *is* starting to move or *is* stopping [to move] *movement*, the values output from the acceleration sensor 316, plots the recorded output values on the coordinate system to find a linear approximation and calculates the slope of the linear approximation as the ratio. Here, an angle ($\theta_{AB}$ in FIG. 4) formed between the reference linear approximation and the linear approximation calculated under the vehicle actual use state corresponds to the vehicle attitude angle θv. Therefore, by comparing the slopes of the two linear approximations or the above-mentioned ratios, the vehicle attitude angle θv can be obtained.

As described above, the vehicle lamp system 200 according to this exemplary embodiment obtains the vehicle attitude angle θv from the reference value of the ratio, that is obtained while the vehicle 300 is on the horizontal plane, and the current ratio to thereby make the optical axis adjustment. According to [the] *an* auto-leveling control system configured such that the reference value of the road surface angle θr is rewritten when the summed angle θ varies while the vehicle is moving, and such that the reference value of the vehicle attitude angle θv is rewritten when the summed angle θ varies while the vehicle is stopped, the repetitive rewriting of the reference values can increase the error of the adjustment. On the other hand, in the auto-leveling control according to this exemplary embodiment, the optical axis position can be adjusted without increasing such adjustment error.

A vehicle lamp system 200 according to an third exemplary embodiment calculates a linear approximation using a set of values output from the sensor during the acceleration of the vehicle and values output from the sensor during the deceleration of the vehicle. Now, description will be given below of this exemplary embodiment. The components of the vehicle lamp system 200 according to the third exemplary embodiment, that are similar to those of the first exemplary embodiment, are given the same reference sings, and the description thereof will be omitted.

Figure 6:
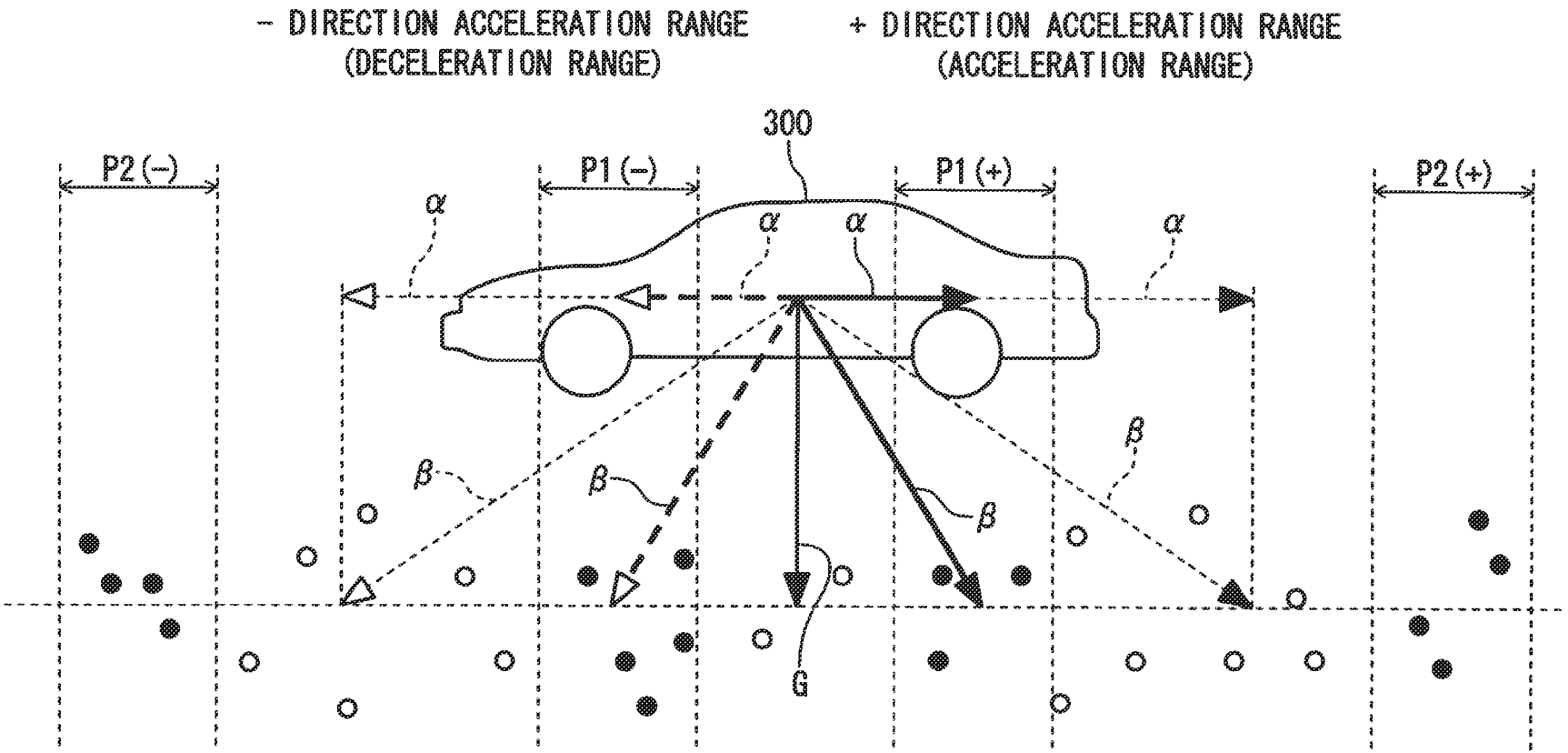
FIG. 6 is a diagram to explain the auto-leveling control of a vehicle lamp system according to an third exemplary embodiment of the present invention.

FIG. 6 is a diagram to explain the auto-leveling control of the vehicle lamp system of the third exemplary embodiment. As shown in FIG. 6, in the vehicle lamp system 200 according to this exemplary embodiment, the [control] *controller/control* unit 228R2 stores a first acceleration range P1(+) and a second acceleration range P2(+) of the acceleration of the vehicle 300 as well as a first deceleration range P1(−) and a second deceleration range P2(−) of the deceleration (negative acceleration) of the vehicle 300 as information on [a] *an* acceleration range in which plotting is carried out to calculate a linear approximation (this information is hereinafter referred to as plot range information). This plot range information has a set of an acceleration side range and a deceleration side range. In this exemplary embodiment, the plot range information has two sets, one set including the first acceleration range P1(+) and first deceleration range P1(−), and the other set including the second acceleration range P2(+) and second deceleration range P2(−). The acceleration range and deceleration range can be set based on the amount of time variations in the vehicle speeds to be detected by the vehicle speed sensor 312 or the magnitude of the vehicle longitudinal direction components that can be obtained from the values detected by the acceleration sensor 316. The plot range information is stored in, for example, the memory 228R4.

For example, during the time from the start of the vehicle 300 to the stop thereof, when the acceleration of the vehicle 300 is within the first acceleration range P1(+) or within the second acceleration range P2(+), or when the deceleration is within the first deceleration range P1(−) or within the second deceleration range P2(−), the [control] *controller/control* unit 228R2 records the values detected by the acceleration sensor 316. The [control] *controller/control* unit 228R2 plots points corresponding to the recorded detection values on a coordinate system having a first axis representing the vehicle longitudinal direction acceleration and a second axis representing the vehicle vertical direction, thereby calculating a linear approximation. The [control] *controller/control* unit 228R2 calculates the linear approximation, for example, at the time when, while the vehicle 300 is moving, the values detected by the acceleration sensor 316 or the plotted values thereof in the first acceleration range P1(+), first deceleration range P1(−), the second acceleration range P2(+) and second deceleration range P2(−) are arranged.

The [control] *controller/control* unit 228R2 corrects the optical axis O and the reference value of the vehicle attitude angle θv based a variation in the slope of the calculated linear approximation at a given timing while the vehicle is moving. More specifically, the [control] *controller/control* unit 228R2 calculates an error component Δθe, which is a difference between the reference value of the vehicle attitude angle θv and a vehicle attitude angle θv obtained from the slope of the linear approximation (a ratio between the temporal change amount of acceleration in the vehicle longitudinal direction and the temporal change amount of acceleration in the vehicle vertical direction). For example, the [control] *controller/control* unit 228R2 calculates the accumulated value of variations in the slope of the linear approximation from the first time to the current time calculations to derive the vehicle attitude angle θv, and finds the error component Δθe from this vehicle attitude angle θv and the reference value of the vehicle attitude angle θv stored in the memory 228R4. Or, the [control] *controller/control* unit 228R2, similarly to the second exemplary embodiment, may obtain a vehicle attitude angle θv from the slopes of the previously stored reference linear approximation and the calculated linear approximation, and may find an error component Δθe from this vehicle attitude angle θv and the reference value of the vehicle attitude angle θv stored in the memory 228R4.

The [control] *controller/control* unit 228R2 corrects the reference value of the vehicle attitude angle θv such that the error component Δθe is reduced. In this case, the [control] *controller/control* unit 228R2, when the absolute value of the obtained the error component Δθe exceeds a threshold value θth ($|\Delta\theta e|>\theta th$), corrects the reference value of the vehicle attitude angle θv by a correction value θc. Also, the control unit 228R2 generates a control signal for adjusting the optical axis position by the correction value θc, thereby correcting the optical axis position. Here, the [control] *controller/control* unit 228R2 may also carry out the above-mentioned correction process, for example, just after the stop of the vehicle 300.

The "threshold value θth" and the "correction value θc" can be set in accordance with the resolution of the optical axis control, the detection accuracy of the error component Δθe, or the detection resolution of the vehicle attitude angle θv using a variation in the slope of the linear approximation. The threshold value θth is set within the range of the error that provides no obstacle to the optical axis control. The correction value θc is set, for example, based on the error that is caused by, of error main factors, an error factor having the smallest generation error value. Such error factor includes, for example, variations in the vehicle attitude under the same load condition, that is, variations in the suspension of the vehicle.

The correction value θc is smaller than the threshold value θth. Due to this, even when the detection accuracy of the error component Δθe is low, the reference value of the vehicle attitude angle θv can be made to approximate gradually to a correct value. For example, the resolution of the angle detection using variations in the slope of the linear approximation is 0.04°, while the threshold value θth is set for 0.1° and the correction value θc is set for 0.03° respectively. The "threshold value θth" and "correction value θc" can be set based on an experiment or simulation by a designer.

As described above, the plot range information has a set of the acceleration side range and deceleration side range. Due to such combination of the acceleration side range and deceleration side range, the error component of the vehicle attitude variations to be caused by acceleration and the error component of the vehicle attitude variations caused by deceleration can cancel each other. This makes it possible to calculate a linear approximation with higher accuracy. Also, the first acceleration range P1(+) and first deceleration range P1(−) as well as the second acceleration range P2(+) and second deceleration range P2(−) are set respectively such that the ranges of the magnitude (absolute values) of the acceleration and deceleration are equal to each other. Due to such setting, the error component of the vehicle attitude variations to be caused by acceleration and the error component of the vehicle attitude variations caused by deceleration can cancel each other. This makes it possible to calculate a linear approximation with further higher accuracy.

In this exemplary embodiment, the first acceleration range P1 (+) and first deceleration range P1 (−) are set such that they respectively provide a range of given gentle acceleration or deceleration. Also, the second acceleration range P2 (+) and second deceleration range P2 (−) are set respectively such that they respectively provide a range of given rapid acceleration or deceleration which is larger when compared with the first acceleration range P1 (+) and first deceleration range P1 (−). In this exemplary embodiment, since the plot range information has a set of gentle and rapid acceleration and deceleration ranges, when compared with a case employing only a set of gentle acceleration and deceleration or only a set of rapid acceleration and deceleration, a linear approximation can be calculated with higher accuracy.

Here, for the first acceleration range P1 (+) and first deceleration range P1 (−) as well as the second acceleration range P2 (+) and second deceleration range P2 (−), there may also be calculated linear approximations independently of each other and the respective correction processes may be carried out according to the slopes of the respective linear approximations. In this case, according to the calculation frequency or calculation accuracy of the set of the first acceleration range P1 (+) and first deceleration range P1 (−) as well as the set of the second acceleration range P2 (+) and second deceleration range P2 (−), the weight of correction may be different from each other, for example, the magnitude of the correction value θc may be varied. Or, the correction process may be carried out according to the average of the slopes of the linear approximations calculated respectively independently. Further, when, in the set of the first acceleration range P1 (+) and first deceleration range P1 (−) as well as the set of the second acceleration range P2 (+) and second deceleration range P2 (−), plots are arranged, a linear approximation may be calculated using these plots; and, when the plots are not ready in both sets within a given time, a linear approximation may be calculated using the plots of the set in which the plots are ready at the that time.

The plot range information may have only the set of the first acceleration range P1 (+) and first deceleration range P1 (−) or only the set of the second acceleration range P2 (+) and second deceleration range P2 (−). For example, the set of the first acceleration range P1 (+) and first deceleration range P1 (−) set in the gentle acceleration and deceleration range, when compared with the set of the second acceleration range P2 (+) and second deceleration range P2 (−) set in the rapid acceleration and deceleration range, has higher frequency that the values detected by the acceleration sensor 316 are included in this range while the vehicle is moving, thereby being able to increase the number of times of correction processes. The number of sets of the acceleration range and deceleration range contained in the plot range information may be three or more.

The first acceleration range P1 (+) and first deceleration range P1 (−) as well as the second acceleration range P2 (+) and second deceleration range P2 (−) may also be set such that the ranges of the magnitude of the acceleration or deceleration are equal to each other and also the ranges of the vehicle speed are equal to each other. In this case, since an error component caused by acceleration and an error component caused by deceleration can cancel each other, a linear approximation can be calculated with further higher accuracy. The range width of the acceleration and deceleration ranges, the magnitude of the acceleration and deceleration and the like can be set based on an experiment or simulation by a designer.

Figure 7:
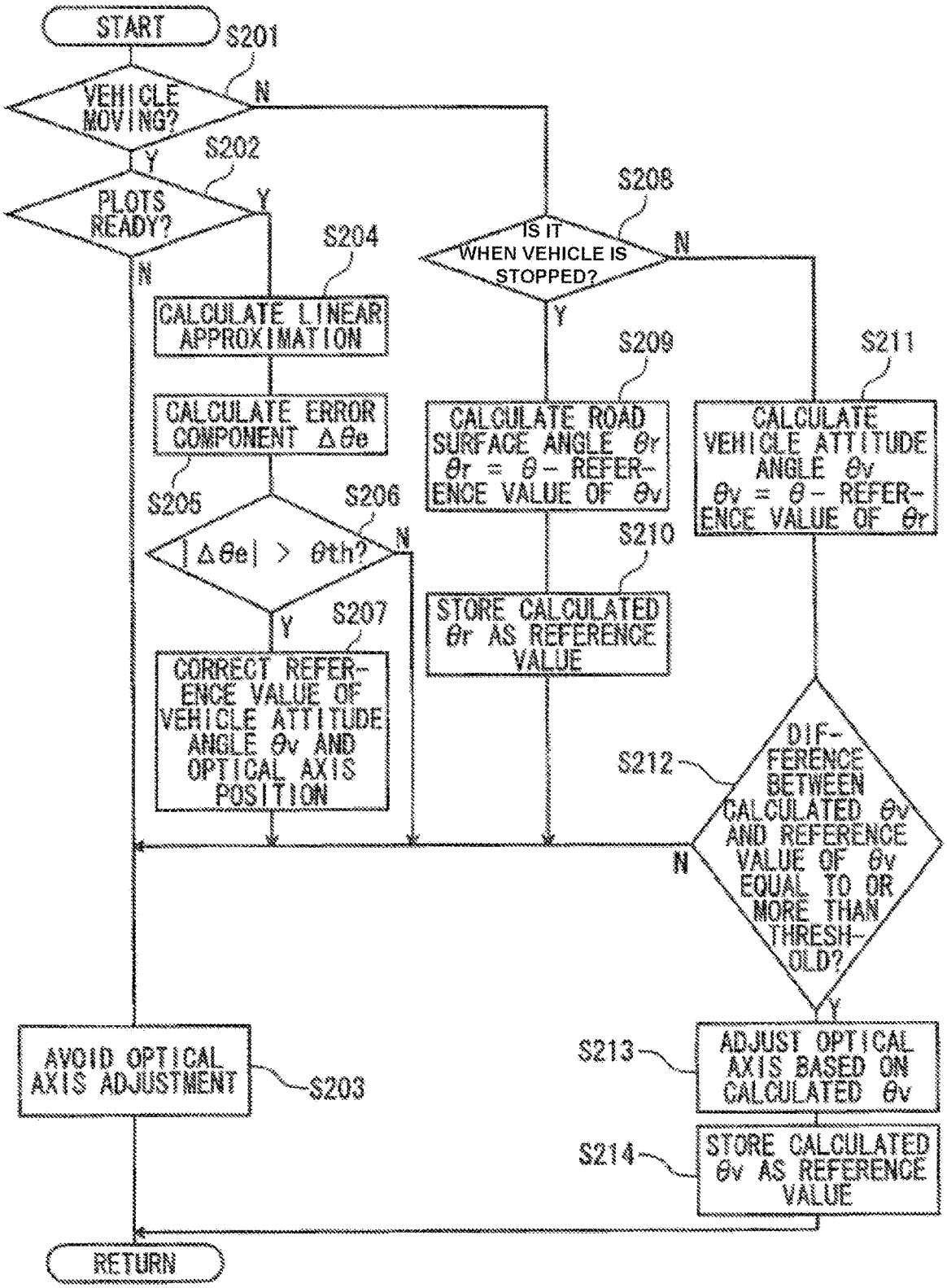
FIG. 7 is a flow chart of the auto-leveling control of the vehicle lamp system according to the third exemplary embodiment.

FIG. 7 is a flow chart of the auto-leveling control of the vehicle lamp system according to the third exemplary embodiment. This flow is executed repeatedly at a given timing by the irradiation controller 228R, more specifically, by the [control] *controller/control* unit 228R2, when an ignition is switched on, for example, in a state where an instruction for execution of the auto-leveling control mode is given by the light switch 304; and, when the ignition is turned off, this flow is ended.

The [control] *controller/control* unit 228R2 determines whether the vehicle is moving (S201). If it is determined that the vehicle is moving (*S201; Y*), the control unit 228R2 determines whether the plots of the values detected by the acceleration sensor 316 in the set of first acceleration range P1 (+) and first deceleration range P1 (−) as well as the set of second acceleration range P2 (+) and second deceleration range P2 (−) are ready (S202). When the plots are not ready (S202; N), the [control] *controller/control* unit 228R2 avoids the optical axis adjustment (S203) and ends this routine. When the plots are ready (S202; Y), the [control] *controller/control* unit 228R2 calculates a linear approximation (S204), and calculates an error component Δθe which is a difference between a vehicle attitude angle θv derived from the slope of the linear approximation and the reference value of a vehicle attitude angle θv stored in the memory 228R4 (S205).

The [control] *controller/control* unit 228R2 determines whether the absolute value of the error component Δθe exceeds the threshold value θth (S206). If it is determined that the absolute value of the error component Δθe exceeds the threshold value θth (S206; Y), the control unit 228R2 corrects the reference value of the vehicle attitude angle θv and optical axis position by the correction value θc (S207). After then, the [control] *controller/control* unit 228R2 avoids the optical axis adjustment with respect to a variation in the summed angle θ obtained from the value detected by the acceleration sensor 316 (S203) and ends this routine. If it is determined that the absolute value of the error component Δθe is equal to or less than the threshold value θth (S206; N), the [control] *controller/control* unit 228R2 avoids the optical axis adjustment without executing the correction process (S203) and ends this routine.

If it is determined that the vehicle is not moving (S201; N), the [control] *controller/control* unit 228R2 determines whether *it is when* the vehicle is stopped (S208). If it is determined that *it is when* the vehicle is stopped (S208; Y), the [control] *controller/control* unit 228R2 calculates the road surface angle θr (S209) and stores the calculated road surface angle θr as a new reference value (S210), avoids the optical axis adjustment (S203) and ends this routine. If it is determined that *it is not when* the vehicle is stopped (S208; N), the [control] *controller/control* unit 228R2 calculates the vehicle attitude angle θv (S211) and determines whether a difference between the calculated vehicle attitude angle θv and the reference value of the vehicle attitude angle θv is equal to or more than a threshold (S212). If the difference is less than the threshold (S212; N), the [control] *controller/control* unit 228R2 avoids the optical axis adjustment (S203) and ends this routine. If the difference equal to or more than the threshold (S212; Y), the [control] *controller/control* unit 228R2 adjusts the optical axis position according to the calculated vehicle attitude angle θv (S213), stores the calculated vehicle attitude angle θv as a reference value (S214) and ends this routine.

As described above, in the vehicle lamp system 200 according to this exemplary embodiment, the [control] *controller/control* unit 228R2 calculates a linear approximation from the plots of the values detected by the acceleration sensor 316 when the acceleration of the vehicle 300 is within a given range and from the plots of the values detected by the acceleration sensor 316 when the deceleration of the vehicle 300 is within a given range. Therefore, an error component such as a vehicle attitude variation caused by the acceleration and an error component such as a vehicle attitude variation caused by the deceleration can cancel each other, thereby being able to calculate a linear approximation having a slope that is closer to the vehicle attitude angle θv.

Also, the [control] *controller/control* unit 228R2 carries out a correction process at the time when plots are obtained in the given acceleration range and deceleration range. In a control system configured such that a correction is carried out immediately after the vehicle stops by calculating a linear approximation from the values detected by the acceleration sensor [316] and recorded from the moving start to stop of the vehicle [300]. If there is an error in the calculation of the vehicle attitude angle θv and optical axis adjustment while the vehicle is stopped after the correction, the vehicle [300] will move while containing such error. However, this exemplary embodiment can avoid such trouble.

Here, the vehicle lamp system 200 according to the above respective exemplary embodiments is a mode of the invention. This vehicle lamp system 200 includes the lamp unit 10 capable of adjusting its optical axis, acceleration sensor 316, and irradiation controllers 228L, 228R for controlling the lamp unit 10, while it carries out the above-mentioned auto-leveling control using the irradiation controllers 228L, 228R.

The other mode of the invention includes the irradiation controllers 228L, 228R respectively serving as control apparatus. The irradiation controllers 228L, 228R respectively include receivers 228L1, 228R1 for receiving vehicle longitudinal direction and vertical direction acceleration from the acceleration sensor 316, [control] *controllers/control* units 228L2, 228R2 for carrying out the above auto-leveling control, and transmitters 228L3, 228R3 for transmitting control signals generated by the [control] *controllers/control* units 228L2, 228R2 to a leveling controller 236. The irradiation controller 228 in the vehicle lamp system 200 corresponds to a controller in a broad sense, while the [control] *controllers/control* units 228L2, 228R2 in the irradiation controller 228 correspond to a controller in a narrow sense.

A further mode of the invention includes a method for controlling a vehicle lamp. This control method adjusts the optical axis of the lamp unit 10 based on a variation in the ratio between the temporal change amount of the vehicle longitudinal direction acceleration and the temporal change amount of the vehicle vertical direction acceleration during at least one of the acceleration and deceleration of the vehicle 300.

While the present invention has been described with reference to certain exemplary embodiments thereof, the scope of the present invention is not limited to the exemplary embodiments described above, and it will be understood by those skilled in the art that various changes and modifications, including combinations of features of different exemplary embodiments described above, may be made therein without departing from the scope of the present invention as defined by the appended claims.

For example, in the respective exemplary embodiments, the irradiation controller 228 may directly control the leveling actuator 226 serving as an optical axis adjusting portion, without a separate leveling controller 236. That is, the irradiation controller 228 may function as the leveling controller 236. The generation of a control signal for instruction of the optical axis adjustment in the above respective exemplary embodiments may also be carried out by the vehicle controller 302. That is, the vehicle controller 302 may serve as a controller for carrying out the auto-leveling control. In this case, the irradiation controller 228 controls the drive of the leveling actuator 226 according to an instruction from the vehicle controller 302.

In the first exemplary embodiment as well, similarly to the third exemplary embodiment, a correction process using a threshold value θth and a correction value θc may be carried out.

What is claimed is:

[1. A vehicle lamp controller comprising:

a receiver configured to receive an acceleration information detected by an acceleration sensor;

a control unit configured to derive a vehicle longitudinal direction acceleration and a vehicle vertical direction acceleration from the acceleration information, and to generate a control signal for instructing an adjustment of an optical axis of a vehicle lamp, based on a variation in a ratio between a temporal change amount of the vehicle longitudinal direction acceleration and a temporal change amount of the vehicle vertical direction acceleration during at least one of an acceleration and a deceleration of a vehicle; and a transmitter configured to transmit the control signal to an optical axis adjusting portion of the vehicle lamp.]

[2. The controller according to claim 1, wherein the control unit plots points corresponding to values detected by the acceleration sensor, over a time during at least one of the acceleration and the deceleration of the vehicle, on a coordinate system having a first axis representing the vehicle longitudinal direction acceleration and a second axis representing the vehicle vertical direction acceleration, and defines a slope of a straight line or a vector obtained from at least two of the points as the ratio.]

[3. The controller according to claim 2, wherein the control unit defines, as the ratio, the slope of the straight line or the vector obtained from the values detected by the acceleration sensor, the values including values detected by the acceleration sensor while the acceleration of the vehicle is within a given range and values detected by the acceleration sensor while the deceleration of the vehicle is within a given range.]

[4. The controller according to claim 2, wherein the control unit obtains a linear approximation with respect to the points, and defines the slope of the linear approximation as the ratio.]

[5. The controller according claim 1, further comprising a memory, wherein the control unit obtains a summed angle including a first angle and a second angle from the acceleration information, the summed angle being an inclination angle of the vehicle with respect to a horizontal plane, the first angle being an inclination angle of a road surface with respect to the horizontal plane, and the second angle being an inclination angle of the vehicle with respect to the road surface, and wherein a reference value of the first angle and a reference value of the second angle are stored in the memory, wherein, when the summed angle varies while the vehicle is stopped, the control unit generates the control signal using the second angle, that is obtained from the summed angle and the reference value of the first angle, and stores the second angle in the memory as the reference value of the second angle, wherein, when the summed angle varies while the vehicle is moving, the control unit does not generate the control signal or generates a control signal for maintaining a position of the optical axis, and when the vehicle stops, the control unit stores the first angle, that is obtained from the summed angle and the reference value of the second angle, in the memory as the reference value of the first angle, and wherein, when the ratio varies, the control unit corrects the position of the optical axis of the vehicle lamp based on the variation in the ratio.]

[6. The controller according to claim 5, wherein the control unit calculates a difference between the reference value of the second angle and the second angle derived from the ratio, and corrects the reference value of the second angle such that the difference is reduced.]

[7. The controller according to claim 6, wherein, when the difference exceeds a threshold value, the control unit corrects the reference value of the second angle by a correction value that is smaller than the threshold value.]

[8. The controller according to claim 1, wherein the control unit obtains an inclination angle of the vehicle with respect to a road surface from the ratio and a reference value of the ratio, that is obtained during at least one of the acceleration and the deceleration of the vehicle on a horizontal plane, and generates the control signal using the inclination angle of the vehicle with respect to the road surface.]

[9. The controller according to claim 1, wherein the acceleration information comprises a summed angle including a first angle and a second angle from the acceleration information, the summed angle being an inclination angle of the vehicle with respect to a horizontal plane, the first angle being an inclination angle of a road surface with respect to the horizontal plane, and the second angle being an inclination angle of the vehicle with respect to the road surface.]

[10. The controller according to claim 1, wherein the control unit is configured to obtain an inclination angle of the vehicle with respect to a road surface based on the variation in the ratio between the temporal change amount of the vehicle longitudinal direction acceleration and the temporal change amount of the vehicle vertical direction acceleration.]

[11. A vehicle lamp system comprising:

a vehicle lamp having an adjustable optical axis;

an acceleration sensor; and a controller configured to control the vehicle lamp, wherein the controller comprises:

a receiver configured to receive an acceleration information detected by the acceleration sensor;

a control unit configured to derive a vehicle longitudinal direction acceleration and a vehicle vertical direction acceleration from the acceleration information, and to generate a control signal for instructing an adjustment of the optical axis of the vehicle lamp, based on a variation in a ratio between a temporal change amount of the vehicle longitudinal direction acceleration and a temporal change amount of the vehicle vertical direction acceleration during at least one of an acceleration and a deceleration of a vehicle; and a transmitter configured to transmit the control signal to an optical axis adjusting portion of the vehicle lamp.]

[12. The vehicle lamp system according to claim 11, wherein the acceleration information comprises a summed angle including a first angle and a second angle from the acceleration information, the summed angle being an inclination angle of the vehicle with respect to a horizontal plane, the first angle being an inclination angle of a road surface with respect to the horizontal plane, and the second angle being an inclination angle of the vehicle with respect to the road surface.]

[13. The vehicle lamp system according to claim 11, wherein the control unit is configured to obtain an inclination angle of the vehicle with respect to a road surface based on the variation in the ratio between the temporal change amount of the vehicle longitudinal direction acceleration and the temporal change amount of the vehicle vertical direction acceleration.]

[14. A vehicle lamp control method comprising;

obtaining an acceleration information detected by an acceleration sensor;

deriving a vehicle longitudinal direction acceleration and a vehicle vertical direction acceleration from the acceleration information;

calculating a variation in a ratio between a temporal change amount of the vehicle longitudinal direction acceleration and a temporal change amount of the vehicle vertical direction acceleration during at least one of an acceleration and a deceleration of a vehicle; and adjusting an optical axis of a vehicle lamp based on the ratio.]

[15. The vehicle lamp control method according to claim 14, wherein the obtaining the acceleration information comprises obtaining a summed angle including a first angle and a second angle from the acceleration information, the summed angle being an inclination angle of the vehicle with respect to a horizontal plane, the first angle being an inclination angle of a road surface with respect to the horizontal plane, and the second angle being an inclination angle of the vehicle with respect to the road surface.]

[16. The vehicle lamp control method according to claim 14 further comprising obtaining an inclination angle of the vehicle with respect to a road surface based on the variation in the ratio between the temporal change amount of the vehicle longitudinal direction acceleration and the temporal change amount of the vehicle vertical direction acceleration.]

*17. A method of controlling a part of the vehicle, comprising:*

*determining a temporal change amount of a vehicle longitudinal direction acceleration and a temporal change amount of a vehicle vertical direction acceleration detected by an acceleration sensor during at least one of an acceleration and a deceleration of a vehicle;*

*calculating information on a vehicle angle based on a ratio between the temporal change amount of the vehicle longitudinal direction acceleration and the temporal change amount of the vehicle vertical direction acceleration; and*

*adjusting the part of the vehicle based on the information on the vehicle angle.*

*18. The method according to claim 17, wherein the part of the vehicle is a vehicle lamp, and an optical axis of the vehicle lamp is adjusted based on the information on the vehicle angle.*

* * * * *